Feb. 25, 1969 W. OVERSOHL ET AL 3,429,264
SOLID ROCKET PROPELLANTS
Filed Nov. 25, 1966 Sheet 1 of 2

INVENTORS
WILHELM OVERSOHL
FRITZ CLAUSEN
BY
ATTORNEYS

INVENTORS
WILHELM OVERSOHL
FRITZ CLAUSEN
BY
ATTORNEYS

United States Patent Office 3,429,264
Patented Feb. 25, 1969

3,429,264
SOLID ROCKET PROPELLANTS
Wilhelm Oversohl, Waldkraiburg, and Fritz Clausen, Aschau, Germany, assignors to Nitrochemie G.m.b.H., Aschau, Germany, a corporation of Germany
Filed Nov. 25, 1966, Ser. No. 597,128
Claims priority, application Germany, Dec. 1, 1965, N 27,705; Apr. 9, 1966, N 28,362
U.S. Cl. 102—100        6 Claims
Int. Cl. F42b 9/14, 5/16

ABSTRACT OF THE DISCLOSURE

The invention relates to novel solid rocket propellants comprising a plurality of cylindrical propellant elements having hexagonal-like profiles and slots running longitudinally.

Prior art

Rockets are frequently equipped with solid propellant elements, consisting of 7 or 19 or even 37 plain, tubular bodies, and this construction form of propellants is generally utilized for spin-stabilized rockets, particularly those of larger sizes. These tubular propellants have the disadvantage that the tubes are solidly pressed against the engine wall due to the centrifugal forces resulting from the spinning, and are apt to break, due to reduced wall thickness, relatively early during the combustion process. The usually very rough fracture surfaces effects a considerable enlargement of the combustion surface of the whole propellant, which in turn results in a considerable increase of the chamber pressure because of increased combustion. In specific cases, a certain balance may be obtained by using propellants which combust in the pressure-producing area with pressure-reducing components. However, generally the increase in pressure in the combustion chamber and the greater combustion gas delivery after the breaking of the propellant tubes produces an explosion-like combustion of the remaining propellant which either leads to destruction of the combustion chamber or activation of the warhead ignitor which has been armed by the spinning resulting from the accelerating thrust of the rocket. Under certain conditions, this results in the warhead being detonated over our own battle lines or when the combustion chamber is destroyed, the rocket fragments fall down in this territory.

These dangers increase in proportion to the increase in the caliber and length of the rocket and thus with the amount of propellant at a specific caliber. Furthermore, the efficiency of the propellant is unfavorable, the range of the rocket is reduced and the dispersion is increased.

Generally it is desirable to effect the combustion of propellants in rockets in two phases, namely a launching phase and a flight phase. During the launching phase, the speed of acceleration of leaving the launching platform shall be as high as possible, whereas in the flight phase, only a specific post-acceleration is desired. This two-phase combustion does not exist in propellants which contain normal tube elements. On the contrary, the propellant at first burns with constant thrust up to the breaking of the elements, which then causes an undesirable violent acceleration thrust.

Objects of the invention

It is an object of the invention to provide novel rocket propellants having two-phase combustion.

It is another object of the invention to provide novel rockets propellants which will not disintegrate prematurely.

Still another object of the invention is to provide novel rocket propellants whose combustion characteristics may be adapted to any requirements.

These and other objects and advantages of the invention will become obvious from the following detailed description.

Description of invention

The novel solid rocket propellant of the invention is comprised of a plurality of cylindrical rocket propellant bodies separated from one another in a housing provided with external combustion, the said cylindrical propellants being insulated at their interfaces against combustion and having a hexagonal-like cross-section with rounded edges and slots running longitudinally in relation to the edges. The said slots are preferably arranged with a deep slot alternating with a more shallow slot.

This form of propellant elements provides a longer combustion period and a more satisfactory efficiency of the propellant. Breaks occuring in the final phase of the combustion cannot effect any dangerous increase in the chamber pressure because of increased surface area thereof. Since the combustion surface of the propellants is reduced during combustion, the desired thrust is most intensive at the launching of the rocket and decreases later or during the post-acceleration.

In another embodiment of the invention, the propellant elements with a hexagonal-like cross-section can be arranged about a center tubular element and their cross-section is modified to the form of a circular arc. This embodiment not only has the aforesaid advantages, but also has a propellant density greater than that obtained with the uniform, cylindrical elements of the prior art giving a longer range rocket.

The more or less pronounced rounding off of the edges of the hexagonal cross-section of the propellant elements allows the said elements to be made by extrusion and the automatic clamping of the propellant elements in the combustion chamber can be controlled. Simpler handling is possible by cementing the individual elements of the propellant charge together at their contact edges and in addition a better securing of the individual elements during combustion is guaranteed.

A further embodiment of the invention comprises replacing one or more of the said hexagonal-like propellant elements with tube elements having two or more longitudinal slots. This permits adaptation of the combustion of the propellant to a predetermined thrust. Therefore, the exterior ballistic demands on the thrust in the design of spin-stabilized rockets can be considered and the various frequently deviating demands resulting from the use of the rocket and the range and dispersion thereof can be met.

Referring now to the drawings.

Figure 4:
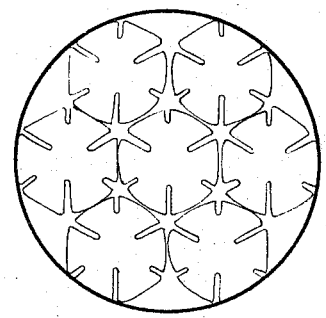
FIG. 4 is a cross-sectional view of a combustion chamber of a rocket of the invention charged with a solid rocket propellant having 7 propellant elements with a hexagonal shape.
Figure 5:
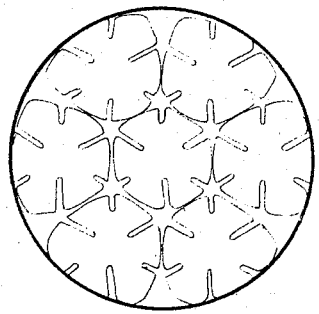
FIG. 5 is a cross-sectional view of a combustion chamber of a rocket of the invention charged with a solid rocket propellant having 7 propellant elements with a hexagonal shape and the outer elements are adapted to a circular shape.
Figure 6:
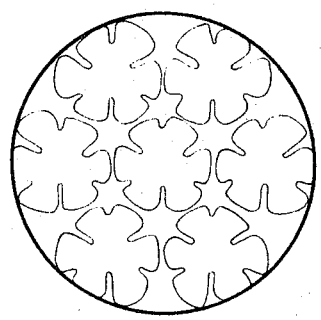
FIG. 6 is a cross-sectional view of a combustion chamber of a rocket of the invention charged with a solid rocket propellant having 7 propellant elements with a hexagonal shape and whose edges are definitely rounded.
Figure 8:
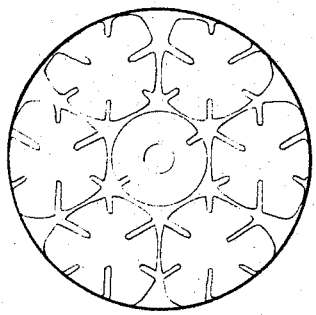
Figure 9:
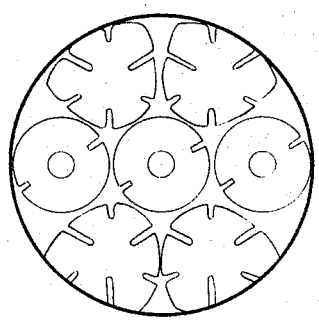
Figure 10:
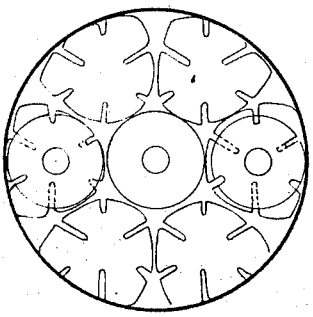

FIGS. 8 to 10 are cross-sectional views of combustion chambers of rockets of the invention charged with a solid rocket propellant having 7 rocket propellants similar to FIG. 4, wherein 1, 3 and 1 respectively of hexagonal elements have been replaced by tubular elements.

Figure 1:
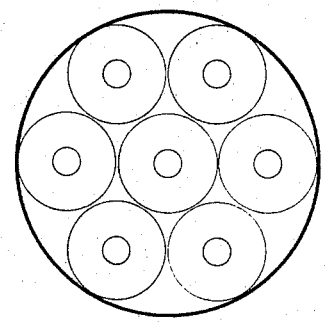
FIGS. 1 to 3 are cross-sectional views of combustion chambers of prior art rockets charged with solid rocket propellants having 7, 19 and 37 tubular elements, respectively.
Figure 2:
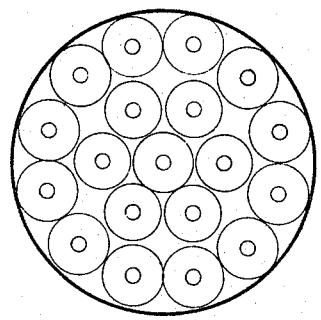
Figure 3:
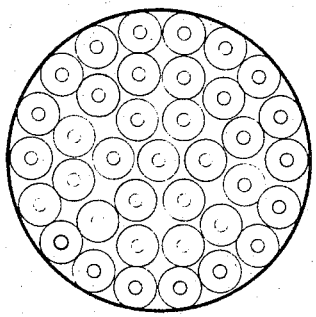
Figure 7:
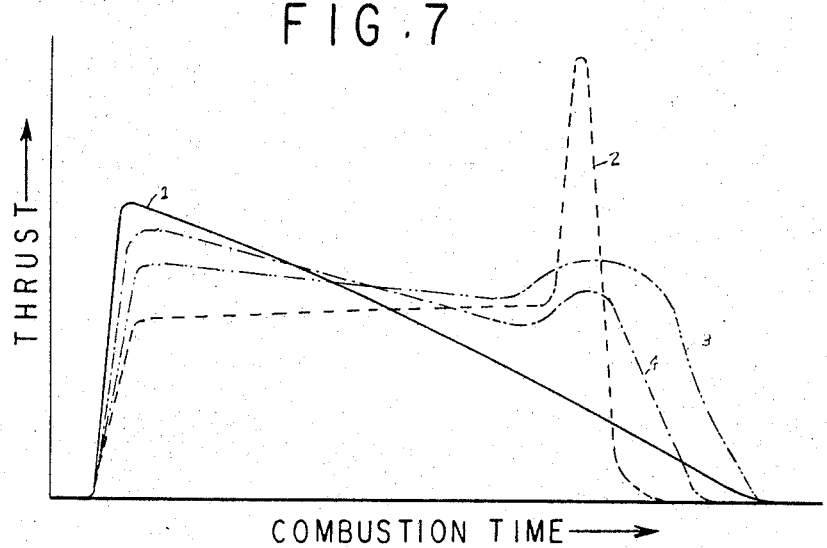
FIG. 7 is a graph illustrating the thrust curve obtained with the rocket propellants of FIGS. 4, 1, 8 and 9.

FIG. 7 illustrates how the thrust curve can be varied and adapted to the trajectory requirements by varying the ratio of tube elements between 12 to 35% by weight of the propellant elements which adjusts the combustion rate. A propellant consisting of hexagonal elements only as in FIG. 4 has a thrust pattern indicated in FIG. 7 as curve 1 with a large thrust action at the beginning of the combustion and a progressively lesser thrust until completion of the combustion. A propellant consisting solely of tubular elements as shown in FIG. 1 has a thrust pattern indicated as curve 2 in FIG. 7 with a peak thrust at the end of combustion caused by premature breaking of the tubes by the centrifugal forces. By replacing 1 or 3 of the hexagonal-like elements with tube elements as in FIGS. 8 and 9 which adjusts the combustion rates, thrust curves 3 (FIG. 8) and 4 (FIG. 9), can be obtained.

For a further high degree of adjustment of the thrust curve, the hexagonal-like elements need not be completely replaced by the tube elements but only a portion of the elements, such as one-half or one-third of various elements, need be replaced by tube elements. FIG. 10 illustrates a combustion chamber having 4 propellant elements with a hexagonal shape, 1 propellant element with a tube shape and two propellant elements half of which has a hexagonal-like cross-section and half of which has a tubular cross-section. By varying the ratio of hexagonal and tubular elements, the thrust curve can be made to approach curve 1 by having mostly hexagonal-like elements or to approach curve 2 by having mostly tubular elements.

A further fine adjustment of the thrust is provided by the use of propellants of various ballistic characteristics such as variable combustion rate, heat content, specific impulse and the like.

The variations possible by the invention provide one skilled in the art with the means to design rockets for the most varied purposes of utilization. The solid rocket propellants of the invention can be used over an extensive range, starting with rockets which are intended to attain only a specific height, such as small-shot rockets or the like, or simple barrage-fire rockets, up to ground and air-screening rockets. The ballistic requirements differ accordingly, starting with limited demands up to the most severe conditions.

While it is known to control the combustion behavior of rocket propellants by arranging slots therein, these slots were used until now only in one-piece propellants having a larger profile in relation to its length, but not in multi-sectional propellants, since it was believed that multi-sectional propellants with slots possessed insufficient strength to prevent breaking thereof. Also, it has been suggested to construct a one-piece propellant having only an internal combustion surface from a plurality of single elements connected without interruption and securely affixed to one another in which the said individual elements had a hexagonal profile. But this is a completely different type of propellant unrelated to the propellants of the present invention.

Various modifications of the propellants of the invention may be made without departing from the spirit or scope thereof and it is to be understood that the invention is to be limited only as defined in the appended claims.

We claim:
1. A solid rocket propellant adapted for reception in the chamber of a rocket comprising a plurality of an elongated propellant elements, said propellant elements having a hexagonal cross-section with rounded edges, means for insulating said elongated elements from each other at the interfaces thereof, and longitudinal slots provided in said elements.

2. A rocket propellant according to claim 1 wherein said slots are alternately deep and shallow about the periphery of said element.

3. A rocket propellant according to claim 1 wherein said elements are disposed annularly about the periphery of a central element whereby respective pairs of said elements are diametrically opposed symmetrically about the axis of said central element.

4. A rocket propellant according to claim 3 wherein the longitudinal axis of said central element is disposed on the longitudinal axis of said chamber.

5. A rocket propellant according to claim 1 wherein said central element is of circular cross-section and includes diametrically opposed slots.

6. A rocket propellant according to claim 5 including at least one pair of diametrically opposed elements of circular cross-section, each said circular element including diametrically opposed slots.

References Cited

UNITED STATES PATENTS

| | | | |
|---|---|---|---|
| Re. 12,660 | 6/1907 | Maxim | 102—100 |
| 273,209 | 2/1883 | Wiard | 102—101 |
| 547,222 | 10/1895 | Maxim | 102—100 |
| 1,077,320 | 11/1913 | Walsh | 102—99 |
| 2,877,709 | 3/1959 | Duckworth | 102—101 |

ROBERT F. STAHL, *Primary Examiner.*